(12) United States Patent
Trajkovic et al.

(10) Patent No.: US 8,095,189 B2
(45) Date of Patent: Jan. 10, 2012

(54) DEVICE AND METHOD FOR BATTERY LIFE MANAGEMENT USING GLOBAL OR LOCAL POSITIONING SYSTEM

(75) Inventors: Miroslav Trajkovic, Centereach, NY (US); Thomas K. Roslak, Northport, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 516 days.

(21) Appl. No.: 12/277,944

(22) Filed: Nov. 25, 2008

(65) Prior Publication Data

US 2010/0130266 A1    May 27, 2010

(51) Int. Cl.
*H04B 1/38* (2006.01)
(52) U.S. Cl. .................................. 455/574; 370/311
(58) Field of Classification Search .................. 455/574; 370/311
See application file for complete search history.

(56) References Cited

U.S. PATENT DOCUMENTS

| | | | | |
|---|---|---|---|---|
| 4,903,319 A * | 2/1990 | Kasai et al. | ................. | 455/574 |
| 6,078,826 A * | 6/2000 | Croft et al. | ................. | 455/574 |
| 6,141,570 A * | 10/2000 | O'Neill et al. | ................. | 455/574 |
| 6,233,448 B1 * | 5/2001 | Alperovich et al. | ........... | 455/417 |
| 6,961,594 B2 * | 11/2005 | Rankin | ........................ | 455/574 |
| 6,963,744 B2 * | 11/2005 | Lin | ................................ | 455/437 |
| 7,848,784 B2 * | 12/2010 | Roh et al. | ..................... | 455/574 |
| 2004/0204184 A1 * | 10/2004 | Lin | ................................ | 455/574 |
| 2007/0037610 A1 * | 2/2007 | Logan | ............................ | 455/574 |
| 2007/0072565 A1 * | 3/2007 | Yach | ............................ | 455/127.1 |
| 2007/0249316 A1 * | 10/2007 | Rao | ................................ | 455/343.1 |
| 2009/0098869 A1 * | 4/2009 | Torrance et al. | ............ | 455/426.1 |
| 2009/0111485 A1 * | 4/2009 | Kitani | ............................ | 455/456.1 |
| 2009/0312032 A1 * | 12/2009 | Bornstein et al. | ........... | 455/456.1 |
| 2010/0304761 A1 * | 12/2010 | Seibert et al. | .............. | 455/456.4 |
| 2010/0323754 A1 * | 12/2010 | Nakagawa | .................. | 455/556.1 |
| 2011/0183726 A1 * | 7/2011 | Deng | ............................ | 455/574 |

* cited by examiner

*Primary Examiner* — Lincoln Donovan
*Assistant Examiner* — William Hernandez

(57) ABSTRACT

A device includes a memory, a wireless transceiver and a positioning system. The memory stores a first area in which a wireless network lacks coverage. The wireless transceiver is adapted to communicate with the wireless network. The positioning system determines a position of the device to determine whether the device is located within the first area. The wireless transceiver does not attempt to communicate with the wireless network if the positioning system determines that the device is located within the first area.

18 Claims, 2 Drawing Sheets

DEVICE AND METHOD FOR BATTERY LIFE MANAGEMENT USING GLOBAL OR LOCAL POSITIONING SYSTEM

BACKGROUND

Extending battery life is a design concern for a wide variety of mobile communications devices. Energy stored in a battery is used rapidly when such devices are in an area where they lack network service. Thus, reducing this energy usage may help to extend battery life.

SUMMARY OF THE INVENTION

The present application relates to a device comprising a memory, a wireless transceiver and a positioning system. The memory stores a first area in which a wireless network lacks coverage. The wireless transceiver is adapted to communicate with the wireless network. The positioning system determines a position of the device to determine whether the device is located within the first area. The wireless transceiver does not attempt to communicate with the wireless network if the positioning system determines that the device is located within the first area.

The present application further relates to a method including determining a position of a mobile device, comparing the position to an area in which a wireless network lacks coverage, and preventing the mobile device from attempting to connect to the wireless network if the position is within the area.

The present application further relates to a computer readable storage medium including a set of instructions executable by a processor. The set of instructions is operable to determine a position of a mobile device, compare the position to an area in which a wireless network lacks coverage, and prevent the mobile device from attempting to connect to the wireless network if the position is within the area.

DETAILED DESCRIPTION

Figure 1:
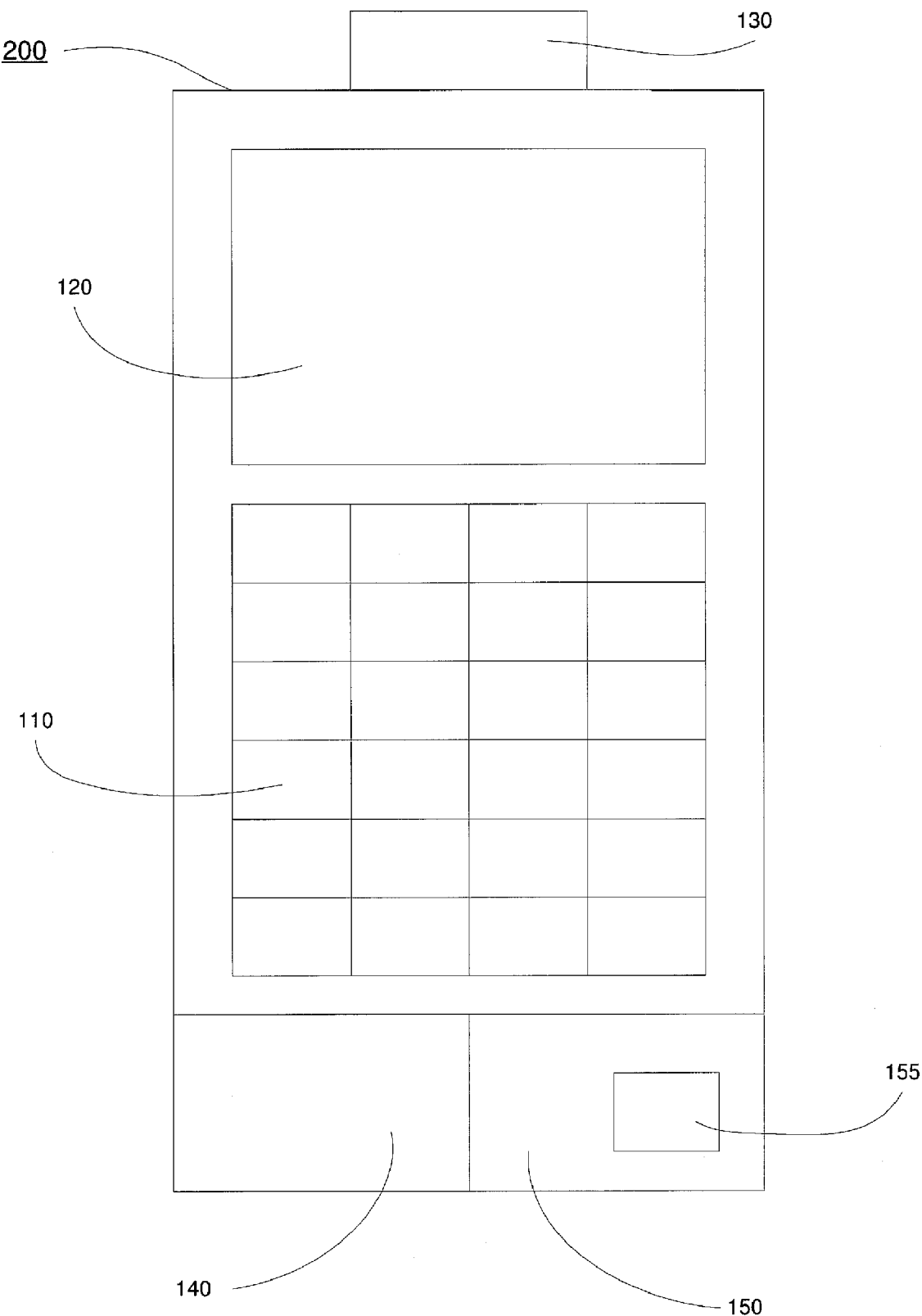
FIG. 1 shows an exemplary device according to the present invention.

The exemplary embodiments of the present invention may be further understood with reference to the following description and the appended drawings, wherein like elements are referred to with the same reference numerals. The exemplary embodiments describe devices and methods for extending the battery life of mobile communications devices. In the exemplary embodiments, mobile communications devices store a map (or other set of boundary conditions) of one or more areas where there is no network coverage and do not attempt network connections while they are in those areas. In other exemplary embodiments, devices may periodically attempt to establish a connection while in such areas in order to verify that the coverage map is up-to-date. Such connection attempts may be made, for example, only if the device's battery power is above a predetermined threshold.

Extending battery life is a design concern for all mobile computing or communications devices. Because reducing the size of the devices themselves is a parallel design goal, and the size and capacity of the battery are thus limited, it is therefore desirable to minimize energy usage and thus extend battery life without increasing battery capacity. Mobile devices typically use battery energy much more rapidly in areas where communications transceivers do not have service, as devices in such locations repeatedly make energy-consuming network connection attempts. The exemplary embodiments may eliminate or reduce the frequency of such attempts.

FIG. 1 shows an exemplary mobile device 100. The device 100 includes an input system 110 (e.g., a keypad, a touchpad, etc.) for receiving input from a user and a display 120 (e.g., an LCD display, etc.) for displaying information to the user. The device 100 also includes a positioning system 130 (e.g., a GPS, a local positioning system ("LPS"), etc.) that is capable of monitoring the position of the device 100. The device 100 further includes a wireless transceiver 140 (e.g., a cellular transceiver, a broadband internet transceiver, a LAN transceiver, a WiFi transceiver, a WiMax transceiver, a Bluetooth transceiver, a 3G transceiver etc.) for wirelessly accessing a network for the transmission and receipt of data. In other exemplary embodiments, the device 100 may include one or more additional wireless transceivers for accessing further wireless networks not accessible using the wireless transceiver 140. Additionally, the device 100 includes a memory 150 for storing various types of data. The memory 150 may be a magnetic drive, a flash memory, etc. In another exemplary embodiment, the device 100 may be strictly a radio device, such as an intelligent modem, and may lack any user interface or display as described above.

The memory 150 stores a No-Coverage Area ("NCA") 155, which is a map and/or list of areas in which no network coverage is available; use of the NCA will be described below. Those of skill in the art will understand that the memory 150 may also store various other operating systems, applications, data, etc. used by the device 100. The terms "NCA" and "NCA 155" will be used through this disclosure to describe both the actual areas without coverage and the index to those areas stored by the device 100. The device 100 may initially be provided to the user with an NCA 155 pre-programmed, or may initially have an empty NCA 155 and build it over the course of the device's operation. The user may also have the option to erase the NCA 155 and start with an empty version; this may be useful over time as network coverage expands. In another exemplary embodiment, rather than being an area where no network coverage is available, the NCA 155 may be a toll or roaming area, in which there is an added cost to the use of the device 100.

Figure 2:
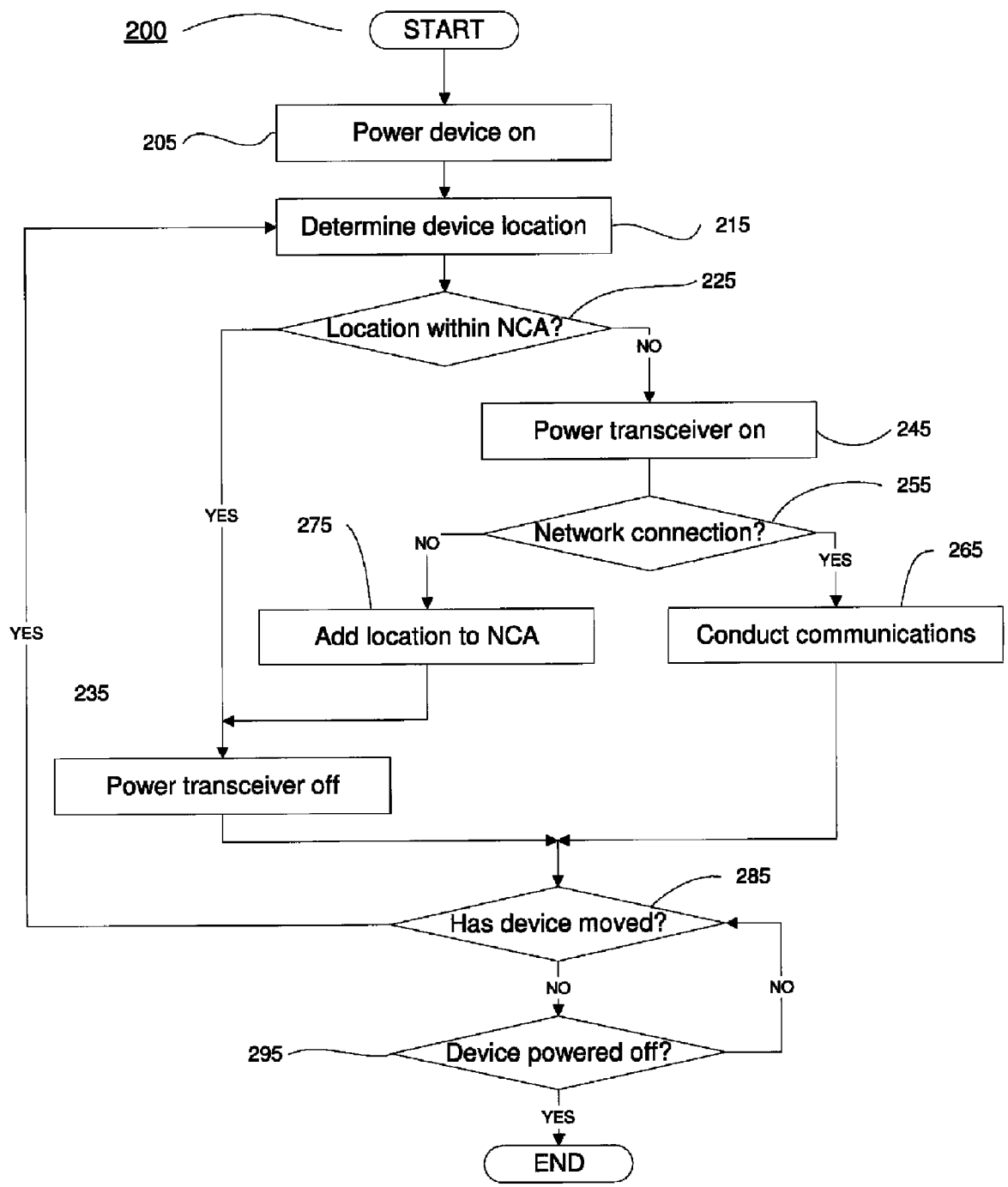
FIG. 2 shows an exemplary method for managing battery life according to the present invention.

FIG. 2 illustrates an exemplary method 200 for minimizing network connection attempts and reducing battery usage according to the present invention. The method 200 will be described specifically with reference to the device 100 described above and depicted in FIG. 1; however, those of skill in the art will understand that other devices may also be capable of performing the method 200. In step 205, the device 100 is powered on. In step 215, the device 100 determines its position using positioning system 130. Those of skill in the art will understand that the specific manner of the position determination will depend on the manner of operation of the positioning system 130.

In step 225, the device 100 evaluates the position determined in step 215 to determine whether it is within the NCA 155. If the device 100 is within the NCA 155, then in step 235 the device 100 powers off the wireless transceiver 140 (or leaves the transceiver 140 powered off if this was already the case). Conversely, if the device 100 is not within the NCA 155, then in step 245 the device 100 powers on the wireless transceiver 140 (or, as above, leaves it powered on if it already was). Thus, when the device 100 is in areas that are known to have no wireless network coverage, it does not use excess energy by attempting network connections. As described above, in another exemplary embodiment, the device 100 may periodically attempt a network connection even while it is in the NCA 155. Such an attempt may be restricted to a predetermined number of connection attempts (e.g., one or two attempts, rather than indefinitely attempting to connect) or may take place only in situations where the NCA 155 has a time stamp that is older than a certain threshold in order to verify that the NCA 155 still exists.

After step 245, in step 255 the device 100, using the wireless transceiver 140, attempts to initiate a network connection. If this is successful, then in step 265 the device 100 may conduct wireless communications using any of the various protocols that are known in the art. However, if connection attempts are unsuccessful, then in step 275 the device's location is added to the NCA 155. The specific process regarding this decision (e.g., how long the device 100 should continue attempting to connect to a network before concluding that no connection is possible, whether the location should be added to the NCA 155 if a network is detected but connection attempts are unsuccessful or only if no network is detected, etc.) may vary among different embodiments of the device 100 or the transceiver 140, different network service providers, etc. After step 275, the method continues to step 235, where the transceiver is powered off as described above.

After step 235 or step 265, the method continues in step 285, where the positioning system 130 determines whether the device 100 has moved. Those of skill in the art will understand that this may be a continuous position monitoring, may be checked periodically, or may be initiated by a user action such as instructing the device 100 to initiate a network connection. While this is occurring, the wireless transceiver 140 may be powered on and conducting communications as per step 265, or may be powered off as per step 235. If the device 100 has moved, then the method returns to step 215, where the positioning system 130 determines its new position. If not, the method continues to step 295, where it is determined if the device 100 has been powered off. If the device 100 is still powered on, the method returns to step 285, where its position continues to be monitored. Powering off the device in step 295 terminates the method 200.

By disabling the wireless transceiver 140 when the device 100 is not in an area where coverage is available, and thus not making unnecessary connection attempts, the battery life of the device 100 can be extended. This may be particularly useful for users in rural or wilderness areas with limited connectivity and no recharging capability, or for users located in buildings that block access to wireless networks.

As described above, the NCA 155 may be updated periodically. The period may depend on several factors such as geographic position (e.g., updates may be more frequent in urban areas than in rural areas) and coverage area changes. The update period may alternately be preset (e.g., once per day, once in the lifespan of a battery, whenever the battery is being charged, etc.).

In another exemplary embodiment, the NCA 155 may be updated using a third-party server or an ad hoc network. In such an embodiment, a user of the device 100 may contact the server and obtain an up-to-date version of the NCA for the local area rather than updating the NCA on its own. Further, the device 100 may communicate with similar devices in its immediate area and exchange coverage information, thereby building the NCA collaboratively, and therefore more rapidly.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalents.

What is claimed is:

1. A device, comprising:
   a memory storing a first area in which a wireless network lacks coverage, the memory including a time stamp of when the first area is stored;
   a wireless transceiver adapted to communicate with the wireless network; and
   a positioning system determining a position of the device to determine whether the device is located within the first area,
   wherein the wireless transceiver does not attempt to communicate with the wireless network if the positioning system determines that the device is located within the first area while the time stamp is younger then a predetermined threshold, and
   wherein if the time stamp is older than a predetermined threshold, the device then periodically attempts to establish communication with the wireless network within the first area.

2. The device of claim 1, wherein the device alerts a user when the positioning system determines that the device is located within the first area.

3. The device of claim 1, wherein the attempts to establish communication are made only if a battery power of the device is above a predetermined threshold.

4. The device of claim 1, wherein the attempts to establish communication are restricted to a predetermined number of connection attempts.

5. The device of claim 1, wherein the first area is assembled from results of prior unsuccessful attempts to communicate with the wireless network.

6. The device of claim 1, wherein a second area is added to the first area if the network is detected but the wireless transceiver unsuccessfully attempts to communicate with the wireless network while the device is in the second area.

7. The device of claim 1, wherein the first area is updated only if no network is detected in the first area.

8. The device of claim 1, wherein the first area is updated once per battery charging action.

9. The device of claim 1, wherein the first area is updated more frequently in an urban area than in a rural area.

10. A method, comprising:
    determining a position of a mobile device;
    comparing the position to an area in which a wireless network lacks coverage;
    storing the area in which a wireless network lacks coverage along with a time stamp of when the area is stored;
    preventing the mobile device from attempting to connect to the wireless network if the position is within the area while the time stamp is younger then a predetermined threshold, and
    if the time stamp is older than the predetermined threshold, periodically attempting to establish communication with the wireless network within the area.

11. The method of claim 10, wherein attempting to establish communication is restricted to a predetermined number of connection attempts.

12. The method of claim 10, wherein attempting to establish communication is performed only if a battery power of an attempting device is above a predetermined threshold.

13. The method of claim 10, further comprising:
    updating the area, wherein the area is updated more frequently in an urban area than in a rural area.

14. The method of claim 10, further comprising updating the area by adding a further area to the area, wherein the further area is an area in which the wireless network is detected but the mobile device made an unsuccessful attempt to connect to the wireless network.

15. The method of claim 10, further comprising assembling the area from results where the mobile device made an unsuccessful attempt to connect to the wireless network.

16. The method of claim 10, further comprising updating the area, wherein the area is updated only if no network is detected in the area.

17. The method of claim 10, further comprising updating the area, wherein the area is updated once per battery charging action.

18. A computer readable storage medium including a set of instructions executable by a processor, the set of instructions operable to:

determine a position of a mobile device;

compare the position to an area in which a wireless network lacks coverage;

store the area in which a wireless network lacks coverage along with a time stamp of when the area is stored;

prevent the mobile device from attempting to connect to the wireless network if the position is within the area while the time stamp is younger then a predetermined threshold, and if the time stamp is older than the predetermined threshold, periodically attempt to establish communication with the wireless network within the area.

* * * * *

UNITED STATES PATENT AND TRADEMARK OFFICE
CERTIFICATE OF CORRECTION

PATENT NO. : 8,095,189 B2  Page 1 of 1
APPLICATION NO. : 12/277944
DATED : January 10, 2012
INVENTOR(S) : Trajkovic et al.

It is certified that error appears in the above-identified patent and that said Letters Patent is hereby corrected as shown below:

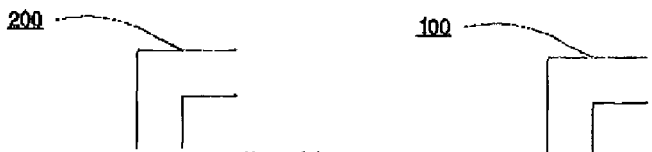

In Fig. 1, Sheet 1 of 2, delete " " and insert -- --, therefor.

Signed and Sealed this
Eighteenth Day of December, 2012

David J. Kappos
*Director of the United States Patent and Trademark Office*